US006938865B1

(12) United States Patent
Day

(10) Patent No.: US 6,938,865 B1
(45) Date of Patent: Sep. 6, 2005

(54) GAUGE MOUNTING ASSEMBLY

(75) Inventor: Gregory E. Day, Great Falls, VA (US)

(73) Assignee: Gauge Works, LLC, Great Falls, VA (US)

( * ) Notice: Subject to any disclaimer, the term of this patent is extended or adjusted under 35 U.S.C. 154(b) by 23 days.

(21) Appl. No.: 10/151,559

(22) Filed: May 20, 2002

(51) Int. Cl.$^7$ ............................................. A47B 96/00
(52) U.S. Cl. .......................... 248/229.14; 248/229.24; 248/316.1
(58) Field of Search ................ 248/229.14, 229.24, 248/227.4, 227.3, 230.5, 231.61, 70, 73, 248/74.4, 481, 231.85, 288.31, 288.51, 315, 248/316.1, 316.6, 689, 224.51, 224.61

(56) References Cited

U.S. PATENT DOCUMENTS

| | | | | |
|---|---|---|---|---|
| 600,642 | A | * | 3/1898 | Hartman .................. 248/229.2 |
| 958,052 | A | * | 5/1910 | Williams ..................... 248/60 |
| 1,227,258 | A | * | 5/1917 | Godley ................. 248/229.24 |
| 1,280,013 | A | * | 9/1918 | Goddard .................. 248/181.1 |
| 1,555,659 | A | * | 9/1925 | Gough .................. 248/226.11 |
| 1,735,212 | A | * | 11/1929 | Pawsat ................. 248/229.24 |
| 1,837,259 | A | * | 12/1931 | Fitzpatrick ................ 248/74.4 |
| 2,727,137 | A | * | 12/1955 | Oharenko ................... 362/306 |
| 3,278,146 | A | * | 10/1966 | Simon .......................... 248/73 |
| 3,612,456 | A | | 10/1971 | Palmer |
| 3,750,241 | A | | 8/1973 | Bootha |
| 3,843,083 | A | | 10/1974 | Angibaud |
| 4,074,402 | A | | 2/1978 | Taketani |
| D255,225 | S | | 6/1980 | Lewis |
| D257,122 | S | | 9/1980 | Price |
| 4,307,864 | A | * | 12/1981 | Benoit .................... 248/222.11 |
| 4,410,155 | A | | 10/1983 | Wetterhorn et al. |
| 4,461,439 | A | * | 7/1984 | Rose ............................ 248/51 |
| 4,557,447 | A | | 12/1985 | Combe |
| 4,895,329 | A | * | 1/1990 | Sloan .................... 248/229.16 |
| 4,948,074 | A | | 8/1990 | Bramhall, Jr. |
| 4,986,001 | A | * | 1/1991 | Giamattei .................... 33/265 |
| 5,037,052 | A | | 8/1991 | Crisp et al. |
| 5,413,007 | A | | 5/1995 | Vernon |
| 5,441,225 | A | | 8/1995 | Hall |
| D367,418 | S | | 2/1996 | Lathrop |
| 5,855,388 | A | | 1/1999 | Brewer |
| 5,860,728 | A | | 1/1999 | Maglica |
| 6,189,229 | B1 | * | 2/2001 | Thomas et al. ................ 34/90 |
| 6,286,797 | B1 | * | 9/2001 | Thaxton ................ 248/229.14 |
| 6,331,089 | B1 | | 12/2001 | Iteya |
| 6,386,786 | B1 | * | 5/2002 | Perlman et al. ............... 403/90 |

* cited by examiner

Primary Examiner—Anita M. King
(74) Attorney, Agent, or Firm—Williams Mullen, PC; Thomas F. Bergert

(57) ABSTRACT

An assembly for attaching gauges or other accessories to vehicles provides a base member for securing the assembly to a vehicle surface and a clamp arrangement secured to the base member for superior versatility and customization. The clamp arrangement includes a substantially spherical ball member and a ball clamp, which grips the ball member and allows for the fixed positioning of a gauge frame member to the inner or outer edges of the ball clamp. A tachometer, gauge or other accessory can be secured within the gauge frame member. The ball clamp may be adjusted about the ball member and the gauge frame member can be fixed in different positions to achieve a desired positioning of the gauge. The gauge frame member can be one of a number of designs, including single or double split clamps.

11 Claims, 10 Drawing Sheets

GAUGE MOUNTING ASSEMBLY

BACKGROUND

1. Field of the Invention

The present invention relates generally to an apparatus for mounting items onto vehicles; more specifically, the invention relates to a rigid and adjustable apparatus for supporting gauges or other items from available areas of vehicles, whether open surfaces or tubular members such as handlebars, roll bars, or A-pillars.

2. Background Information

Some forms of personal transportation lack desired controls, indications, or accessories. Vehicles such as bicycles or snowmobiles offer little space typically considered suitable for instrumentation. Some manufacturers forego such equipment to keep their costs low. These problems provide opportunities for creative after-market solutions. Because of the expense of design and production, after-market manufacturers try to design products applicable to a wide variety of makes or styles of vehicles. Therefore, it is important that after-market solutions be adjustable, capable of suiting most drivers regardless of the vehicle. If a gauge mount is not adjustable, then it may not permit ergonomically correct positioning. Ideally, the flexibility of orientation and location would help a variety of drivers of a single vehicle to achieve spatial compatibility with the installed indications. Such products should also be effective, inexpensive, and easy for the driver to install. For performance racing vehicles, it is also important for the gauge mount to fixedly hold the gauge in place through high speeds and hard turns.

Most vehicles feature some exposed, available surface. For example, motorcycles and bicycles commonly have tubular handlebars. Vehicles used in motor sports are likely to provide roll over protection through tubular roll bars or cages; additionally, in some of these vehicles the A-pillar is also an exposed tube. Larger vehicles, such as boats and automobiles may have free surfaces on dashboards or consoles. If such spots are adjacent to the vehicle driver, they can provide an opportunity for mounting a gauge, control, or accessory.

One approach, seen mostly on two wheeled vehicles, is to create a support bracket with holes that allows the bracket to be held to the vehicle by existing vehicle bolts that are passed through the bracket. Examples of this technique are disclosed in U.S. Pat. No. 5,855,388 to Brewer and U.S. Pat. No. D 367,418 to Lathrop. These inventions often rely on the common availability of bolts near the driver's view in the center of bicycle or motorcycle handlebars; the bolts may fasten the head of the handlebar assembly, tie into the front forks, or anchor the top of the suspension. This approach is limited in several ways. First, the positioning is limited to the location and availability of the mounting bolt or bolts, possibly inhibiting good spatial compatibility. Second, the installation requires removing a bolt, possibly from the handlebar or front suspension; novice mechanics may be uncomfortable undertaking this task. Third, it is possible that the added thickness of the bracket could impede the proper functioning of the mounting bolt if its threads are no longer able to engage.

Another static or fixed approach, common for larger vehicles such as automobiles and boats, is to fix a mounting structure or frame to an available surface; this structure ideally holds and orients the gauge or accessory towards the driver. Some static, after-market gauge mounts are available for placing gauges on the driver side A-pillar, in pods on the surface of dashboards, or adjacent to existing instrument clusters. These solutions often involve a tradeoff between spatial compatibility and vehicle applicability. If the manufacture seeks to optimize ergonomics, then the product is likely to be suitable only for a single or small number of vehicle models. For example, a pod designed to be in the driver's view when placed on the curved dash of a subcompact car is unlikely to be suitable for the straight dash of a large sedan. Some static mounts offer adjustment of the gauge in a single plane, such as pitch. In general, however, static mounts are limited in their ability to achieve spatial compatibility for a wide variety of drivers.

Alternatively, some devices take advantage of the space available on exposed tubular members, creating brackets that clamp onto features such as handlebars. U.S. Pat. No. 3,843,083 to Angibaud, U.S. Pat. No. D 257,122 to Price, U.S. Pat. No. 5,860,728 to Maglica, and U.S. Pat. No. 6,331,089 to Iteya all seek to mount gauges or accessories to exposed tubes. The problem with this approach is gripping the tube in a rigid manner, while offering flexibility in adjustment.

A number of these designs use a form of a single split clamp and gauge support. The Angibaud apparatus forms a sort of single split clamp when the single screw is tightened. Similarly, '122 to Price, '089 to Iteya, and several of the embodiments in '728 to Maglica use single split clamps. In some cases, such as in the Angibaud and Price designs, the clamp uses a single fastener to provide the clamping force for both the handlebar and the gauge support; when the screw is loosened to adjust one clamp, the apparatus loses its grip on both single split clamps. Depending on the orientation and shape of the bar, for example, single split clamps can also suffer from uneven distribution of compressive forces, reducing the friction available to hold the gauge in place.

Some devices incorporate double split clamps. For example, U.S. Pat. No. 5,413,007 to Vernon depicts a double split handlebar clamp with a plurality of machine screws. The Vernon design features enhanced stability from a double split clamp with a fixed mount. However, the gauge may be adjusted only through the rotation of a threaded member. This design limits the range of positions available for the gauge.

The design in '728 to Maglica uses a double split arrangement to grip handlebars, and a form of ball joint. This invention centers on a spherical ring "gripping" member, which is a ball or sphere with a cylindrical hollow into which can be inserted a removable flashlight. The mounting of this gripping member offers some ability to rotate for adjustment, but the housing must retain the gripping member within its mount, which limits its rotation when it is "gripping" or holding a cylindrical object like a flashlight. For the intended application of the '728 invention, this is not a serious problem because the angles needed for a flashlight to aid a bicycle driver at night are relatively limited. However, it would pose several problems if one tried to adapt the Maglica arrangement for use with a gauge.

Different drivers, and even different positions of a single driver can require a broad range of adjustment to preserve spatial compatibility of an important gauge or indication. Additionally, items such as gauges typically have a greater diameter to length ratio, which means that the spherical ring "gripping" member and its housing would have to be much larger to accommodate the larger diameter. This increased size could inhibit adjustment, add weight, obscure the view of the gauge, and create wind resistance. For the reasons discussed above, these adaptations are likely to reduce further its functionality.

In several embodiments, the Maglica ball is positioned in a double split housing with the additional function of clamping to the handlebar. This approach shares the drawback with single fasteners described above, in that any loosening of the handlebar clamp would similarly loosen the force on the floating ball until it is ultimately released from the housing. Likewise, loosening the housing to adjust the "gripping" member could result in a loss of grip on the handlebars. In another Maglica embodiment, the "gripping" member is held in place by compression of a washer by a threaded ring. In that case, the clamping of the ball is achieved through the friction of an appropriately sized rubber washer.

Notably, the patents to Iteya, Angibaud, and Price also use clamps and types of ball joints to make their gauge mounts adjustable. The Iteya design, like the Maglica design, is limited in that it involves inserting an item within the spherical ring, restricting its range of motion. Angibaud and Price rely on single split clamps to grip both handlebars and a spherical member; the spherical member is then connected by a neck to the gauge, accessory, or additional mount. Aside from the single fastener weakness described above, these designs need a compressive housing to keep the sphere steady under the torque of a gauge positioned at the end of this neck. The compressive force and friction of the housing must be able to overcome bumps and forces of everyday driving. At the same time, this housing limits the range of motion for gauge adjustment.

None of these designs offers both rigidity and a wide range of flexibility. The present invention is directed to an improved gauge mount for overcoming this challenge.

SUMMARY OF THE INVENTION

The present invention is directed to a gauge mount with increased flexibility of positioning and consistent or improved rigidity. To attain this, the present invention comprises a base member that secures to a vehicle surface and provides a spherical or ball member at a desired location, along with a ball clamp for gripping the ball member. A gauge frame member for receiving a gauge or other indicator can be attached to the ball clamp. The base member hosts the ball member in a position suited for the application; for example, spatial compatibility may dictate a central positioning of a tachometer for a motorcycle. The gauge frame member can be one of a number of designs appropriate for the gauge or accessory.

The base member can assume one of several forms, including a single split clamp, a double split clamp, or an injection molded unitary member having a substantially flat surface, so as to provide a foundation upon which to secure the remainder of the assembly. Various attachment means can be employed depending on the base member used. For example, when using a double split clamp, the two members of the clamp can be compressed onto the vehicle portion such as through spring clips or externally threaded fasteners, for example.

The ball member is secured to an outside surface of the base member. A double split ball clamp includes a pair of ball clamp members which are compressed or mate onto the ball through some compressive means, such as spring clips or externally threaded fasteners, for example. The ball clamp members are provided with an inner and outer surface, and the outer surface of each ball clamp member is, in one embodiment, provided with a flange shaped so as to provide a solid mating surface for a gauge frame member.

The gauge frame member is fixed to the pair of ball clamp members, either on the inner or outer edges of the ball clamp members. The ball clamp members can receive various shapes and forms of gauge frame members. For example, the gauge frame member can be an arc shaped band or a cup-shaped cylinder.

It is therefore an object of the present invention to provide a mounting assembly for gauges, controls, or other items that is adjustable and rigid.

It is an object of the invention to provide a mounting assembly that is resistant to the torque generated by the offset weight of a gauge, control, or other item.

It is yet another object of the present invention to provide a gauge mount that is easy to install and adjust.

DETAILED DESCRIPTION

Figure 1:
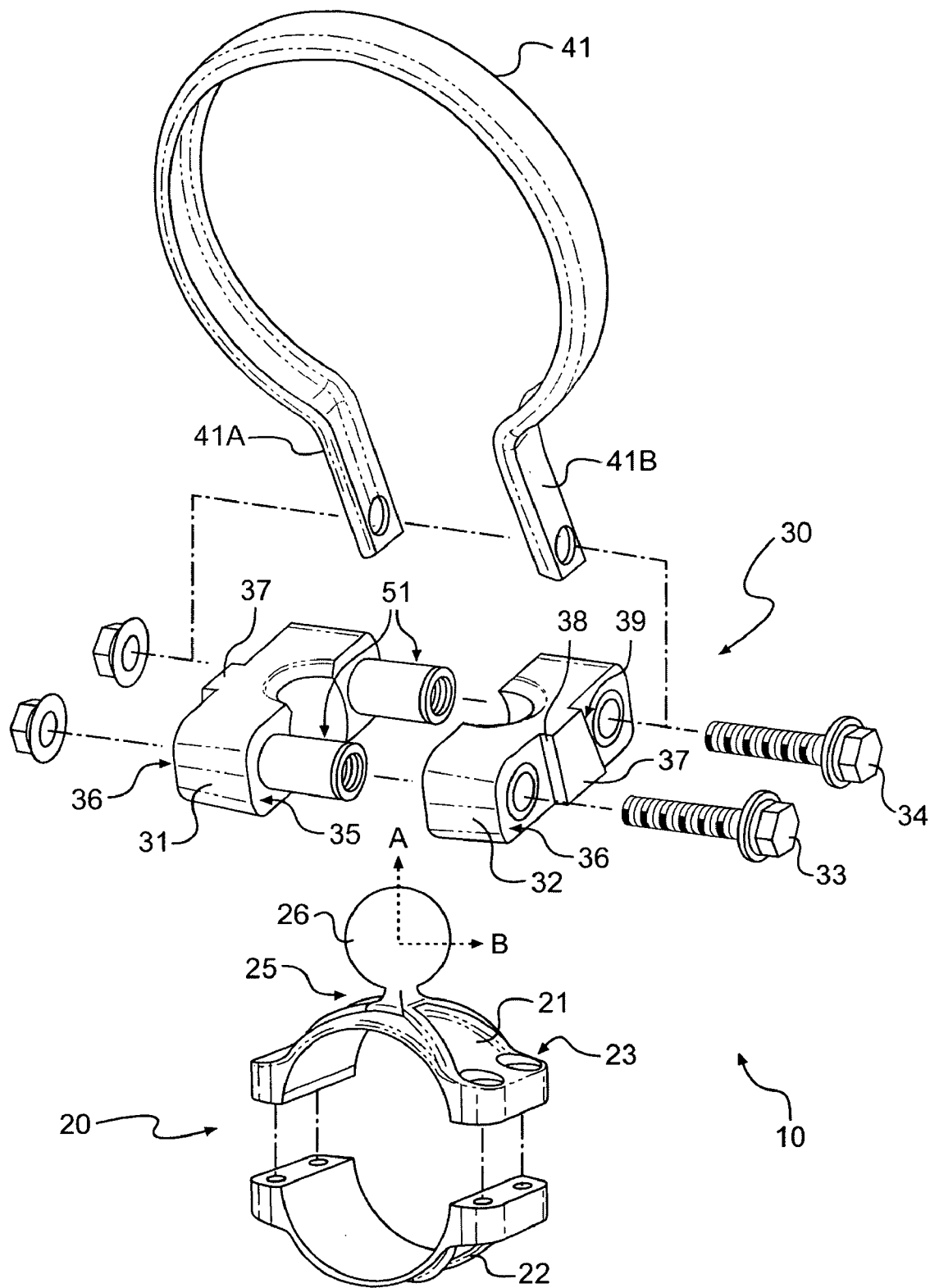
FIG. 1 is an exploded perspective view of one embodiment of the assembly of the present invention.

With reference to the drawings, as shown in FIGS. 1 through 8B, there is provided a gauge mounting assembly 10 having a base member 20, a ball member 26, a ball clamp 30, and a gauge frame member 41. The base member 20 secures the assembly of the present invention to a mounting surface of a vehicle (not shown). Optionally, base member 20 is double split as shown in FIG. 1, and a compression means such as a plurality of fasteners compresses the two portions 21, 22 of the base member 20 uniformly about the mounting surface of the vehicle. The fasteners can extend through openings 23 in the base member 20. A double split clamp is preferred for attaching to tubular portions of a vehicle.

Those skilled in the art will recognize that other clamping or mounting arrangements can be employed. For example, as shown in FIGS. 8A and 8B, there is provided a unitary base member 20 for mounting to a flat surface of a vehicle.

Figure 7A:
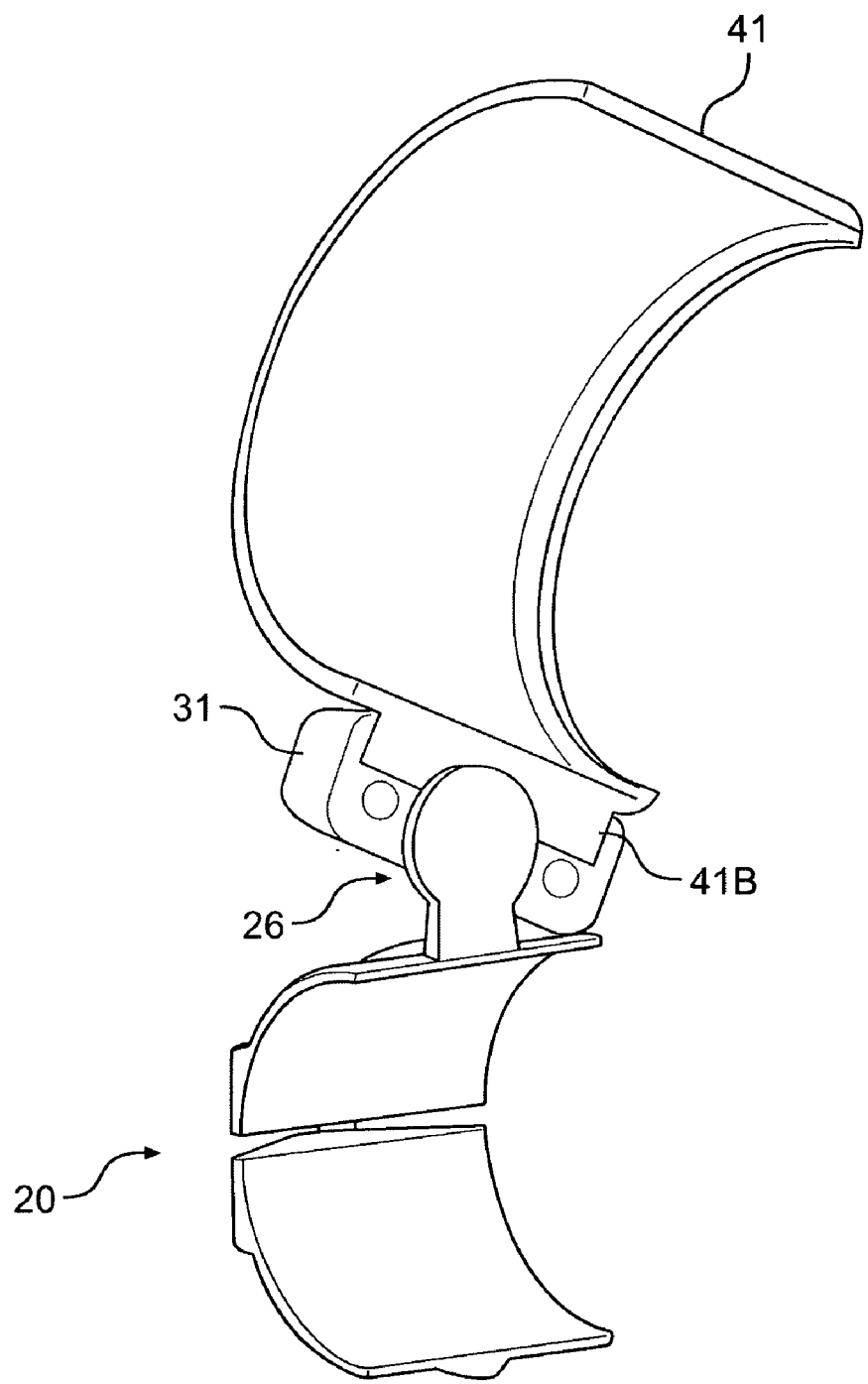
FIG. 7A is a perspective view of a cross-section of one embodiment of the assembly of the present invention, showing the gauge frame member mounted to the inner edges of the ball clamp members.
Figure 7B:
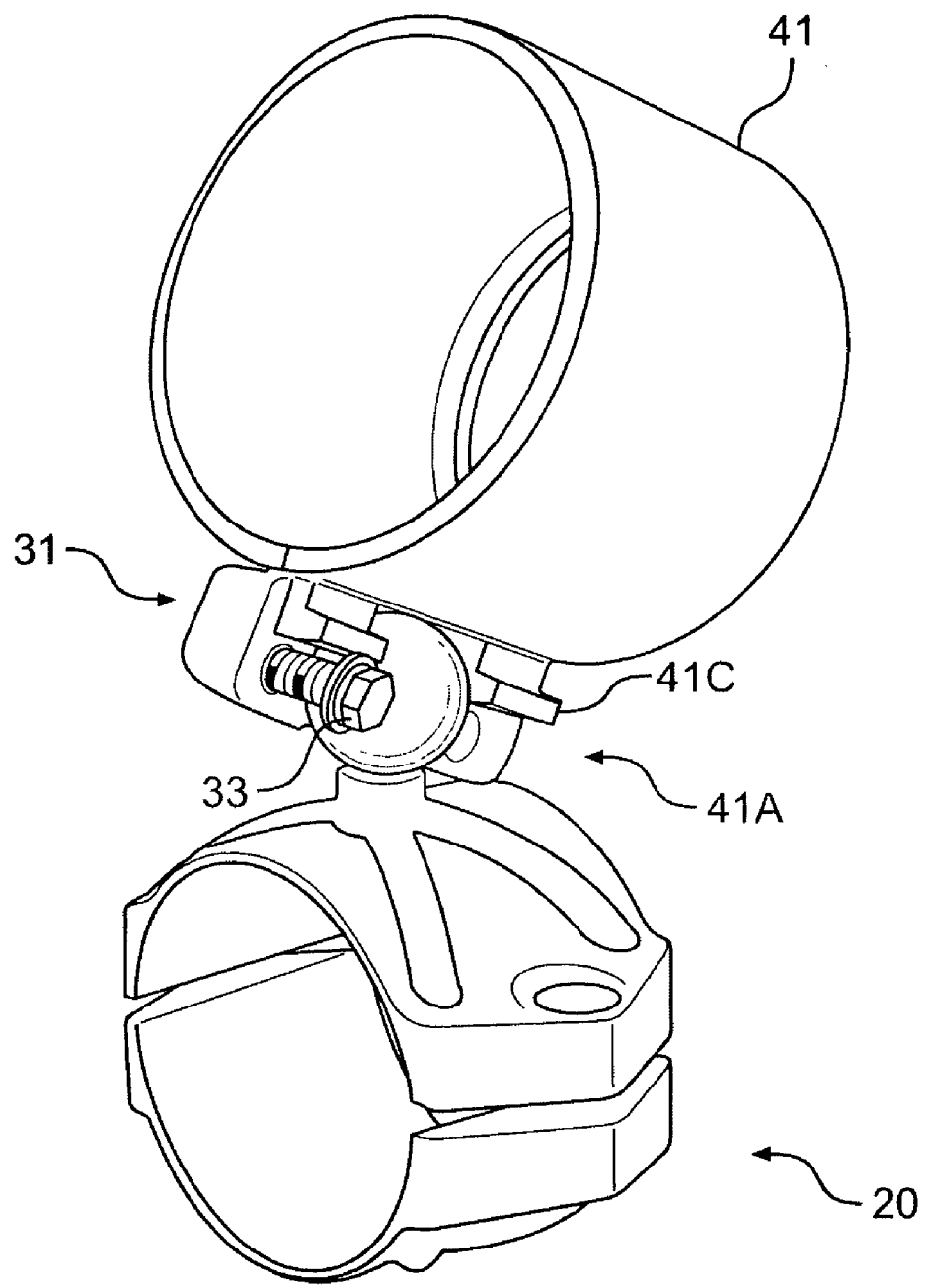
FIG. 7B shows a perspective view of one embodiment of the assembly of the present invention, wherein one of the ball clamp members is removed.
Figure 7C:
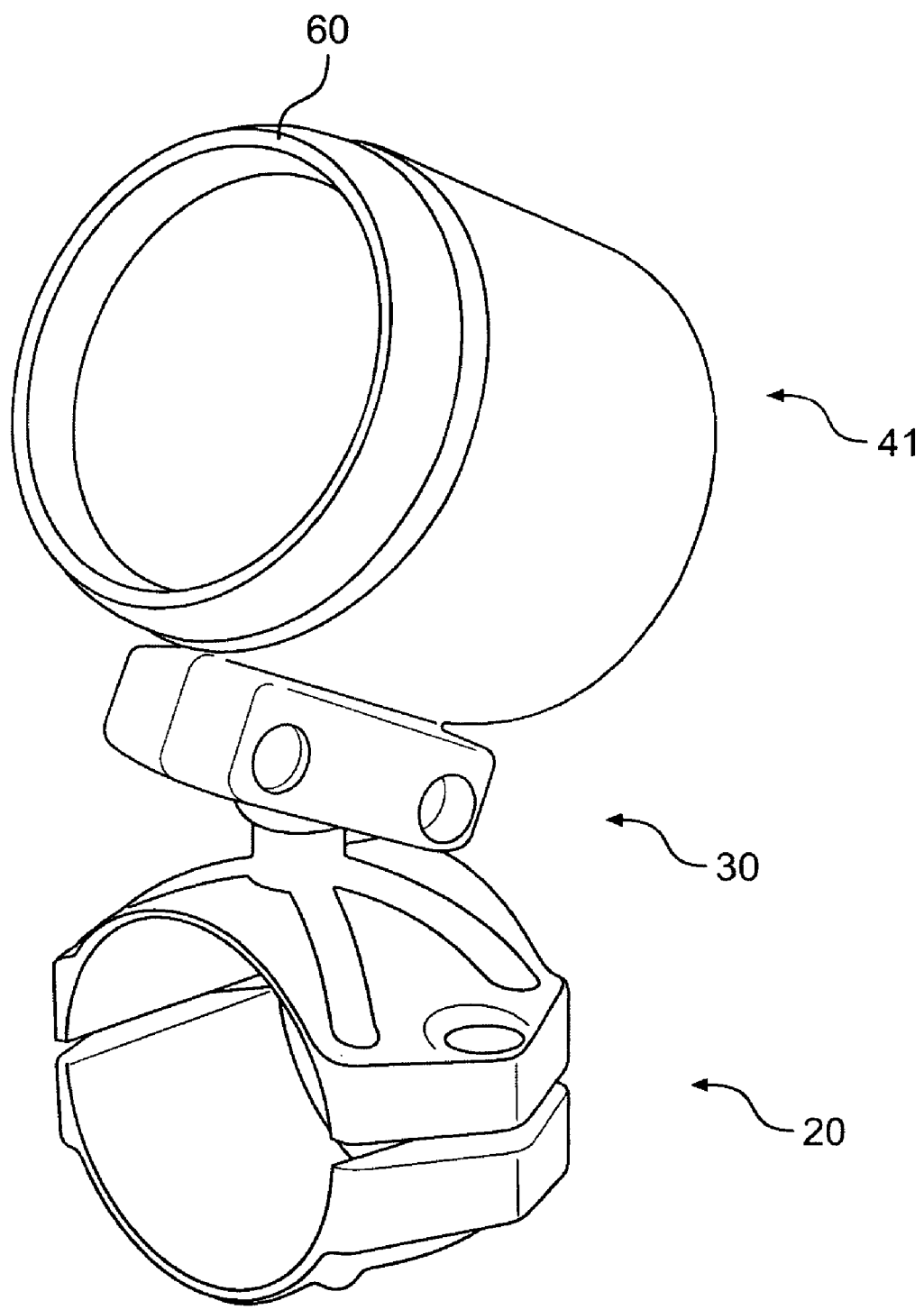
FIG. 7C shows a perspective view of the completed assembly of the embodiment of the invention shown in FIGS. 7A and 7B, with a gauge inserted in the frame member.
Figure 8A:
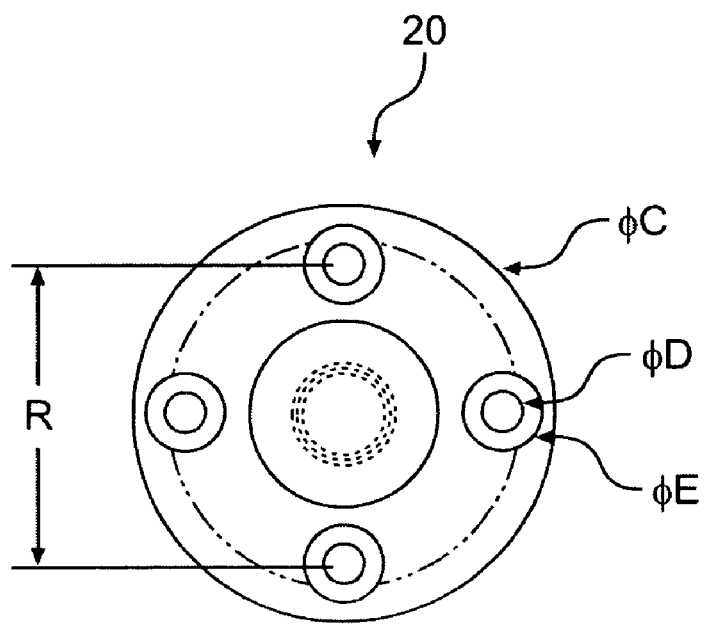
FIGS. 8A and 8B show top plan and front elevational views, respectively, of one embodiment of the base member of the present invention.
Figure 8B:
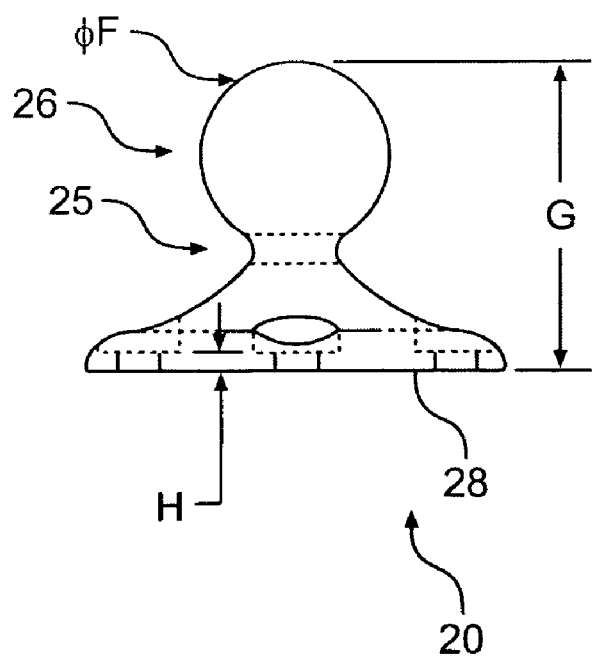

As shown in FIGS. 1, 8A and 8B, a ball member 26 is fixedly secured to base member 20. In one embodiment, ball member 26 is formed integrally with base member 20, such as through injection molding, for example. Ball member 26 is provided with a neck portion 25 to allow sufficient clearance for proper operation of the assembly of the present invention. As shown in FIGS. 1 through 7C, the ball clamp 30 is movably affixed about the ball member 26 so as to enable 360 degree rotation of the ball clamp about the vertical axis A of the ball member. In one embodiment of the invention, neck portion 25 of ball member 26 is sufficiently long to allow ball clamp to rotate within a range of from approximately 20 to approximately 70 degrees about the horizontal axis B of the ball member 26. The limitations of rotation of the ball clamp 30 about the horizontal axis B of the ball member 26 are provided by the base member 20 and/or the vehicle mounting surface. Optionally, ball clamp 30 is double split as shown in FIGS. 1 through 4 and 7, and a compression means such as a plurality of fasteners 33, 34 compresses the two portions 31, 32 of the ball clamp 30 uniformly about the ball member. In one embodiment, one ball clamp member 31 is provided with cylindrical sleeves 51 for mating with appropriate receptor openings on the interior surface of opposite ball clamp member 32. Those skilled in the art will recognize that other clamping arrangements can apply here.

As shown in FIG. 1, each ball clamp member 30 can be provided with an inner 35 and outer 36 edge, with a flange 37 on each respective outer edge 36. In one embodiment of the invention, each flange 37 has a substantially trapezoidal shape, with the two non-parallel sides providing edges 38, 39 adapted to receive a gauge frame member 41 as described hereafter. In one embodiment of the invention, the flange 37 on each outer edge 36 of its respective ball clamp member includes an edge 38 which is substantially perpendicular to the upper and lower surfaces of the ball clamp member 30, and an edge 39 which continues in a substantially straight line from the upper to the lower surface of the ball clamp member 30 at an angle Y as shown in FIG. 3. In one embodiment, angle Y is from approximately 60 to approximately 70 degrees. Each flange 37 is oriented so as to be substantially a mirror image of the flange of the opposite ball clamp member when the ball clamp members 31, 32 are mated about the ball member 26, as shown in FIGS. 2 through 4.

Figure 6:
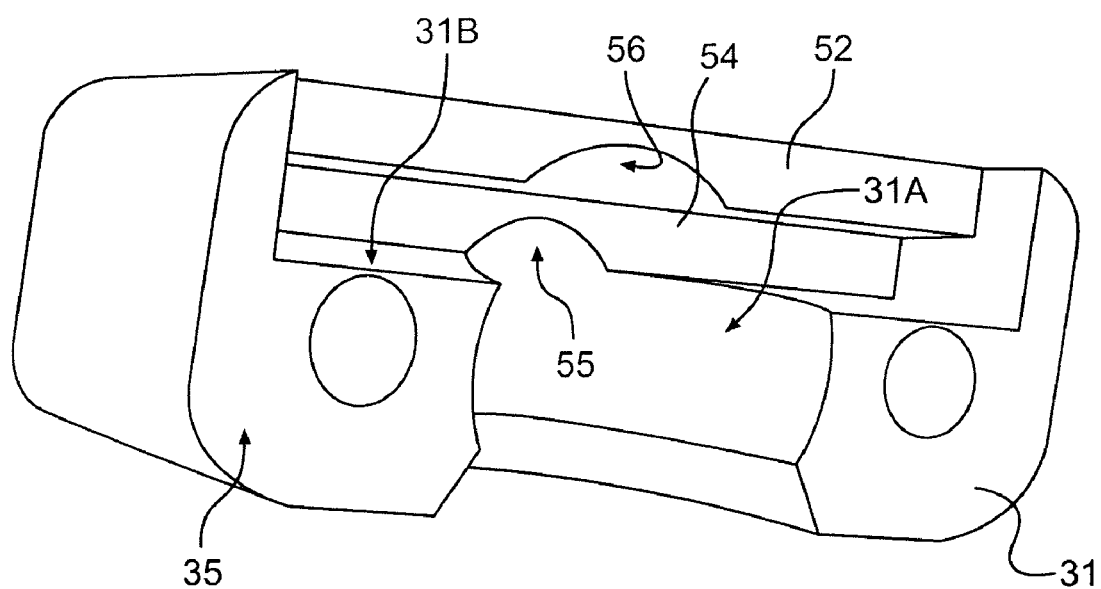
FIG. 6 is a perspective view of one embodiment of a ball clamp member of the present invention.

In the embodiment of the invention as shown in FIG. 6, the inner edge 35 of each ball clamp member 31, 32 is provided with a recessed arcuate pocket 31A and a recessed platform 31B. In this embodiment, each ball clamp member 31, 32 is provided with a top wall 52 and a back wall 54 for securely maintaining the gauge frame member. In one embodiment, the top wall and the back wall are provided with a recessed interior surface as at 55 and 56, respectively, to complement the recessed arcuate pocket 31A in receiving the ball member.

Figure 2:
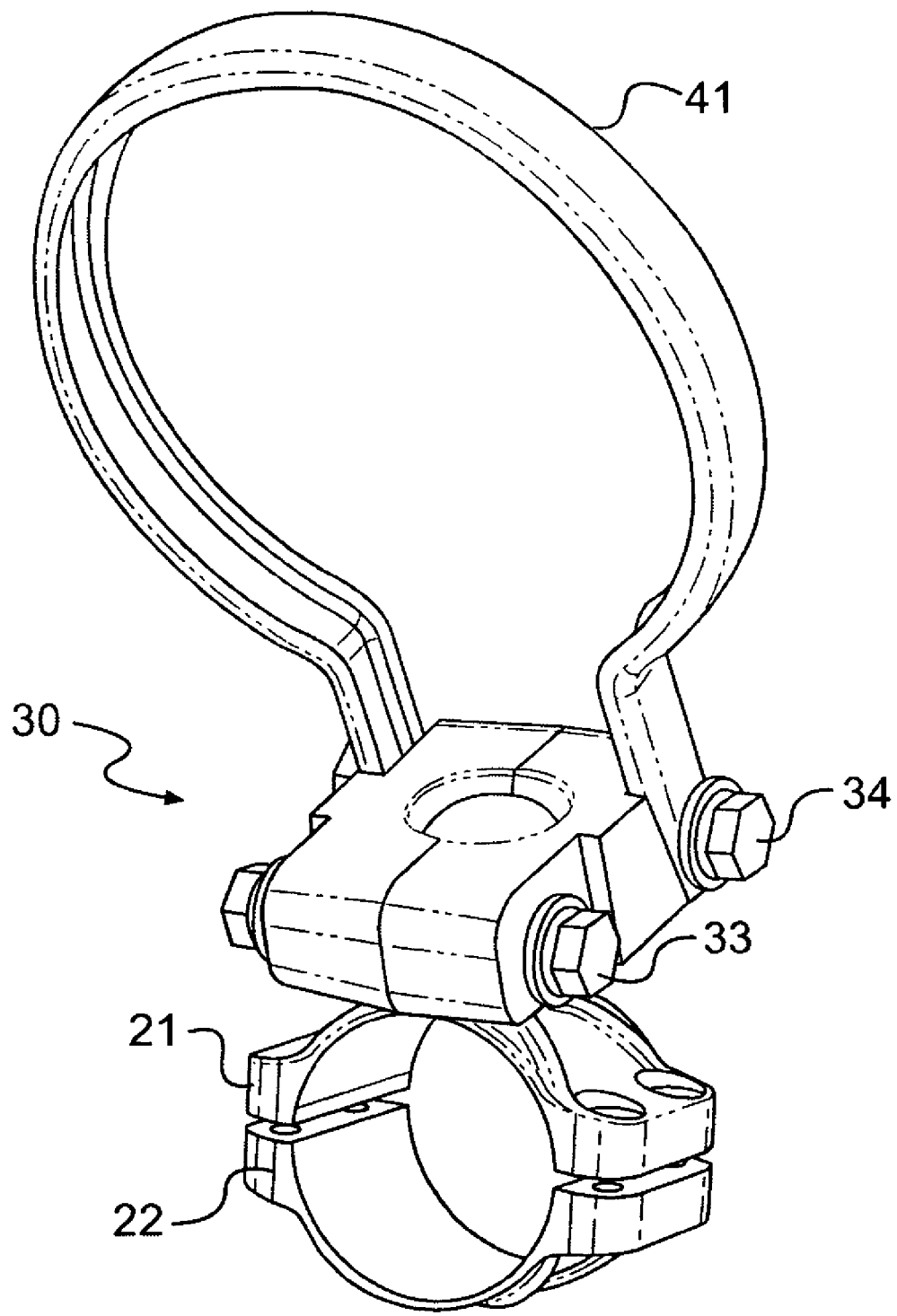
FIG. 2 is a perspective view showing the assembled embodiment of FIG. 1, showing the gauge frame member secured to the perpendicular edges of the ball clamp member flanges.
Figure 3:
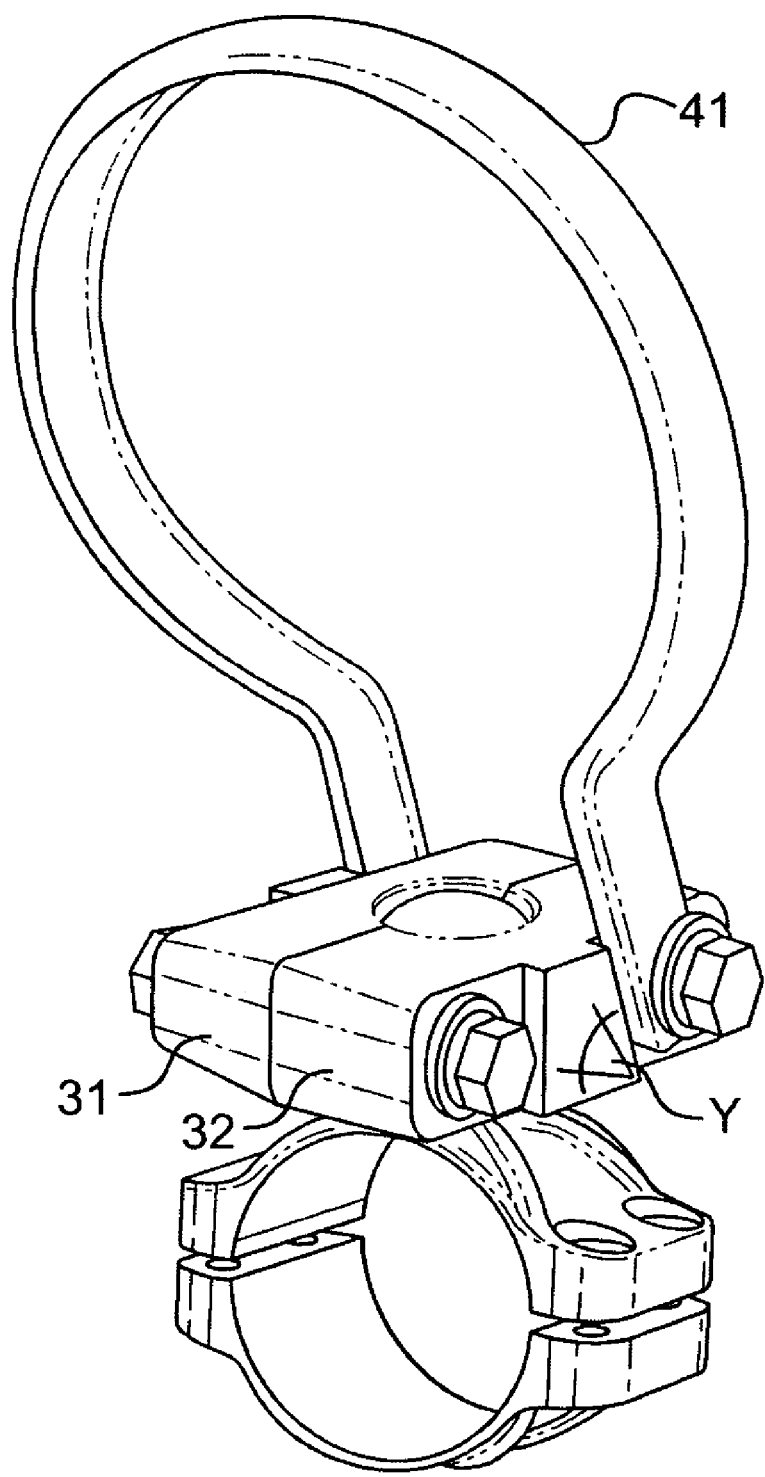
FIG. 3 is a perspective view similar to FIG. 2, showing the gauge frame member secured to the angled edges of the ball clamp member flanges, wherein the ball clamp members have been inverted with respect to their orientation in FIG. 2.
Figure 4:
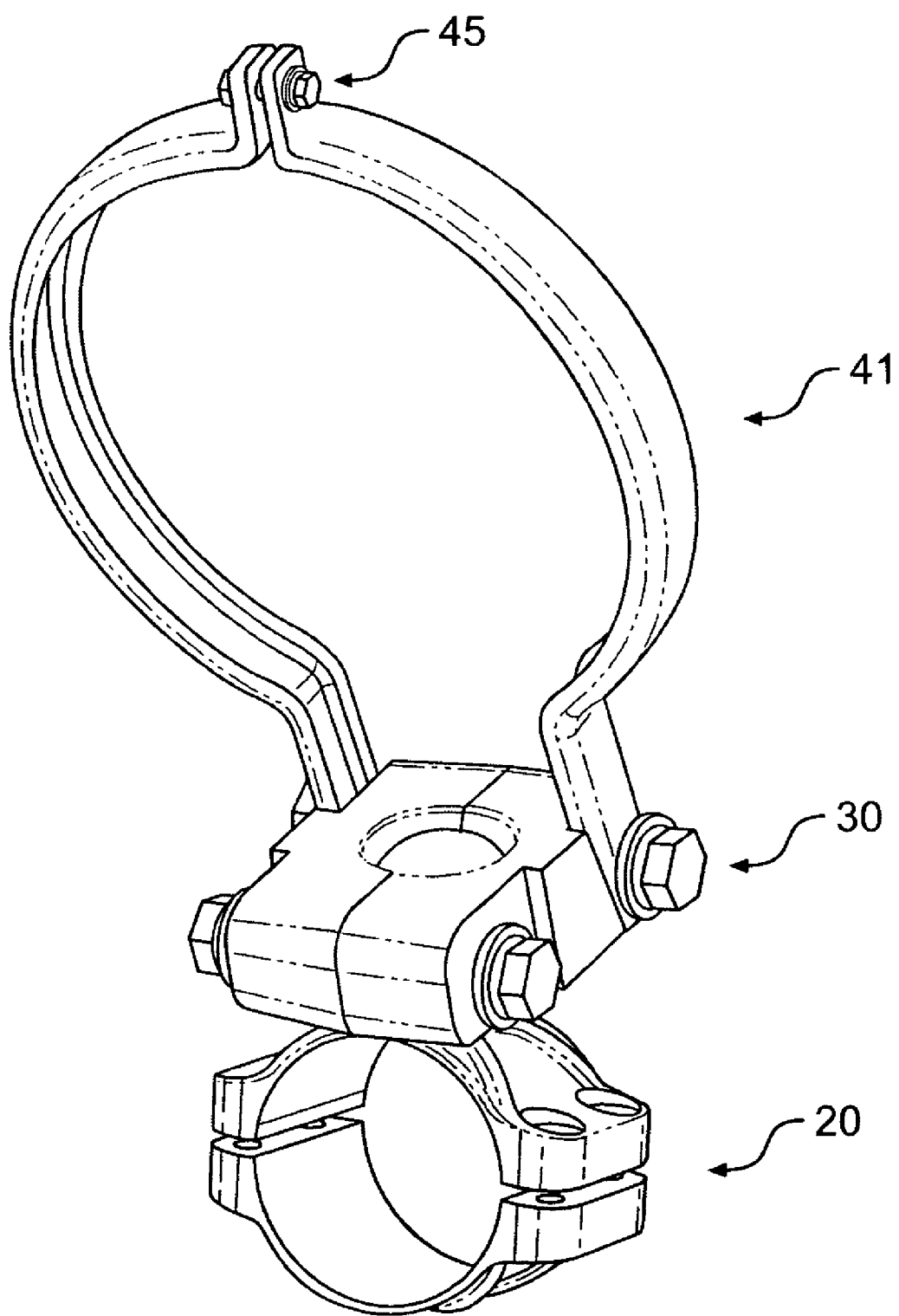
FIG. 4 is a view showing the gauge frame member as a double split clamp.

As shown in FIGS. 1 through 7C, gauge frame member 41 can be mounted to the outer 36 or the inner 35 edges of the ball clamp members 31, 32. For example, as shown in FIGS. 1 through 3, gauge frame member 41 is an arc shaped band having a pair of substantially parallel legs 41A and 41B which form a single split clamp. Each leg has a hole to allow fasteners 33 and 34 to pass through when ball clamp 30 is being compressed onto ball 26. Tightening fasteners 33 and 34 closes legs 41A and 41B of gauge frame member 41, holding it in the desired position. The arc shape of gauge frame member 41 could be sized to accommodate a gauge or other accessory. When fasteners 33 and 34 are tightened, gauge frame member 41 grips a gauge or other accessory, holding it in place. Fasteners 33 and 34 also bring ball clamp members 31 and 32 together, compressing ball member 26. Shock absorbing material, such as rubber, may be placed between legs 41A and 41B and ball clamp members 31 and 32 to reduce any vibration, or in a variety of alternate locations that would be apparent to those skilled in the art.

FIG. 2 shows an embodiment where gauge frame member 41 is fixed to ball clamp members 31 and 32 so as to be positioned at a substantially perpendicular angle to the upper and lower surfaces of ball clamp members 31 and 32. FIG. 3 shows gauge frame member 41 at an acute angle to the upper surface of ball clamp members 31 and 32. In the embodiment shown in FIG. 3, the ball clamp member 30 has been inverted with respect to its orientation in FIG. 2. This capability enhances the versatility of the device of the present invention, and adds range to the angular setup of any gauge subsequently mounted within the gauge frame assembly.

FIG. 4 shows an embodiment where gauge frame member 41 is in the form of a double split clamp secured by an appropriate fastener 45, which may be a nut and bolt or other similar arrangement.

Figure 5A:
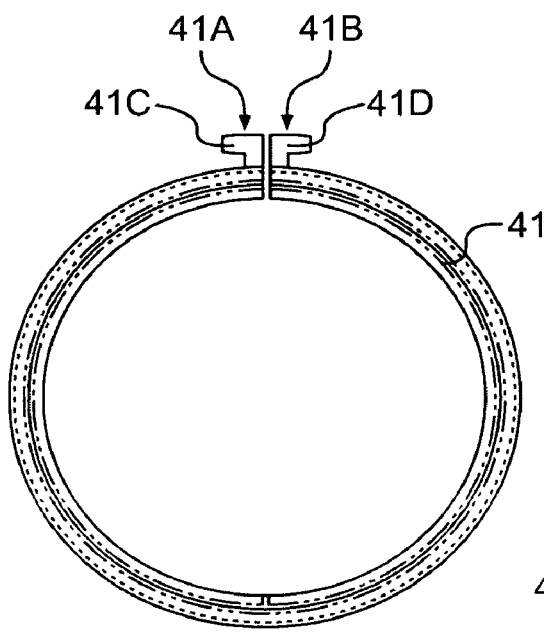
FIG. 5A is a front elevation of one embodiment of the gauge frame member of the present invention.
Figure 5B:
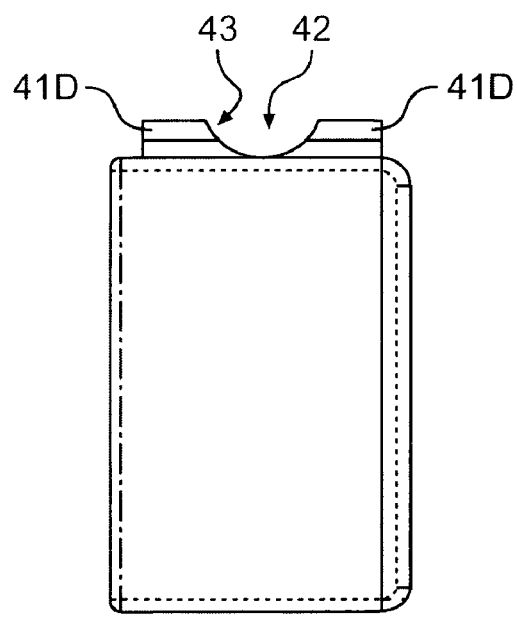
FIG. 5B is a right side view of the gauge frame member of FIG. 5A.
Figure 5C:
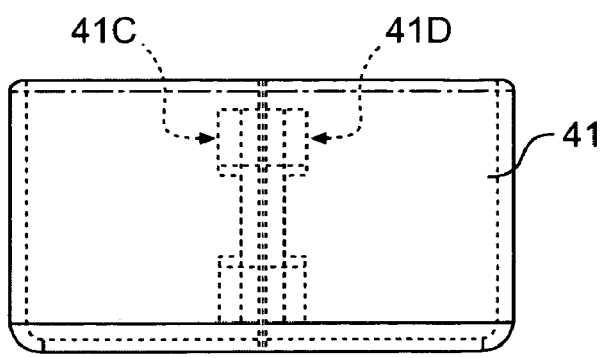
FIG. 5C is a bottom plan view of the gauge frame member of FIG. 5A.

FIGS. 5A through 5C show gauge frame member 41 in the form of a single split clamp having a pair of L-shaped legs 41A and 41B, with opposing pairs of feet 41C and 41D. FIG. 6 shows an arcuate pocket 31A and a recessed platform 31B on ball clamp member 31. Feet 41C and 41D fit into grooves or recessed platforms 31A and 32A on first and second ball clamp members 31 and 32. FIGS. 7A through 7C show various such connections. With grooves 31A and 32A located on the inner edges or mating faces of first and second ball clamp members 31 and 32, tightening fasteners 33 and 34 closes L-shaped legs 41A and 41B of gauge frame member 41, holding it in the desired position, as shown in FIG. 7B. FIG. 7C shows a gauge 60 maintained within gauge frame member 41. As shown in FIGS. 5A and 5B, legs 41A and 41B are provided with curved surfaces as at 42 to allow proper alignment with ball member 26. Thus, feet 41C and 41D each have curved inside edges 43 adapted to receive ball member 26.

It will thus be seen that provision for ball member 26 is made throughout the design of the interior portion of the ball clamp members 31, 32, as at 31A, 55 and 56 in FIG. 6. Further provision for the ball is made in legs 41A and 41B as at 42 and 43 in FIG. 5B. Such provisions enable the smooth rotation of ball clamps about ball member 26 as well as a tight fitting relationship between ball clamps and ball member when the ball clamps are fastened together.

FIG. 8 shows an embodiment where base member 20 is a static structure capable of being secured to a vehicle and forming a stable base for ball member 26. In this embodiment, the ball clamp and gauge frame member can be secured as previously described. Although a static base member 20 may render this embodiment less amenable to relocation, it could be desired for some applications. In one embodiment of the device as shown in FIGS. 8A and 8B, base member 20 includes a threaded fastener extending upwardly through the flat bottom surface 28 of the base member through an optional supporting member and into a threaded cavity in ball member 26. As shown in FIGS. 8A and 8B, the base member can be provided with specific dimensions R, C, D, E, F, G and H to facilitate implementation of the invention. By way of example only, these dimensions can be as follows in one embodiment: R=approximately 1.5 inches, C= approximately 2 inches, D=approximately 0.2 inches, E=approximately 0.39 inches, F= approximately 0.875 inches, G=approximately 1.5 inches and H=approximately 0.1 inches.

In operation, base member 20 is secured to the desired portion of a vehicle, such as the A-pillar of a racing vehicle, in a location the driver considers appropriate. A gauge may then be placed inside the gauge frame member 41; ball clamp 30 is then secured to ball member 26 in a desired orientation by tightening optional fasteners 33 and 34. Variations in embodiments may alter aspects of the operation, but such alterations are apparent by the above description.

It should be understood that the foregoing description and examples are only illustrative of the present invention; the optimum dimensional relationships for the parts of the invention, including variations in size, materials, shape, form, function and the manner of operation, assembly and use, are deemed readily apparent to one skilled in the art, and all equivalent relationships to those illustrated in the drawings and described in the specification are intended to be encompassed by the present invention. Thus, various alternatives and modifications can be devised by those skilled in the art without departing from the invention. Accordingly, the present invention is intended to embrace all such alternatives, modifications, and variances that fall within the scope of the appended claims.

What is claimed and desired to be secured by Letters Patent is:

1. An adjustable assembly for mounting gauges or other items to a vehicle, comprising:
   a base member adapted for securing to a vehicle surface, said base member having a ball member fixed to an outer surface thereof;
   a ball clamp movably secured about said ball member, said ball clamp including a pair of mating ball clamp members, each of said ball clamp members having an inner edge and an outer edge; and
   a gauge frame member having a pair of substantially parallel legs extending outwardly from an outer surface thereof so as to form a split or opening therebetween, said gauge frame member being fixedly securable to the inner edges of said pair of mating ball clamp members.

2. The assembly as described in claim 1, wherein said ball member has a vertical axis and a horizontal axis and wherein said ball clamp is capable of 360 degree rotation about said ball member vertical axis and rotation from between 20 and 90 degrees about said ball member horizontal axis.

3. The assembly as described in claim 1, wherein each of said inner edges of said pair of mating ball clamp members is provided with a recessed arcuate pocket and a recessed platform for cooperatively engaging said ball member and said gauge frame member, respectively.

4. The assembly as described in claim 1, wherein the gauge frame member is a single split clamp.

5. The assembly as described in claim 1 wherein each of said legs is provided with a foot extending substantially perpendicularly therefrom.

6. The assembly of claim 1 wherein said base member is a single split clamp having an interior surface which defines a substantially cylindrical opening for engaging a cylindrical portion of a vehicle mounting surface.

7. The assembly of claim 1 wherein said base member is a double split clamp having an interior surface which defines a substantially cylindrical opening for engaging a cylindrical portion of a vehicle mounting surface.

8. The assembly of claim 1 wherein said base member is an injection-molded single piece unit having a substantially planar lower surface for engaging a substantially flat portion of a vehicle mounting surface.

9. A method for providing an adjustable assembly for mounting gauges or other items to a vehicle, comprising the steps of:
   providing a base member adapted for securing to a vehicle surface, said base member having a ball member fixed to an outer surface thereof;
   providing a ball clamp movably secured about said ball member, said step of providing said ball clamp including providing a pair of mating ball clamp members, each having an inner edge and an outer edge; and
   securing a gauge fame member to said ball clamp, said gauge frame member having a pair of substantially parallel legs extending outwardly from an outer surface thereof so as to form a split or opening therebetween, said step of securing said gauge frame member including fixedly securing said gauge frame member to the inner edges of said pair of mating ball clamp members.

10. An adjustable assembly for mounting gauges or other items to a vehicle, comprising:
   a base member adapted for securing to a vehicle surface, said base member having a ball member fixed to an outer surface thereof; and
   a ball clamp movably secured about said ball member, said ball clamp including a pair of mating ball clamp members, each of said ball clamp members having an inner edge and an outer edge, wherein each of said outer edges of said pair of mating ball clamp members is provided with a flange having a substantially trapezoidal shape.

11. A method for providing an adjustable assembly for mounting gauges or other items to a vehicle, comprising the steps of:
   providing a base member adapted for securing to a vehicle surface, said base member having a ball member fixed to an outer surface thereof;
   providing a ball clamp movably secured about said ball member, said ball clamp including a pair of mating ball clamp members, each having an inner edge and an outer edge; each of said outer edges being provided with a flange having a substantially trapezoidal shape; and
   securing a gauge fame member to said ball clamp.

* * * * *